United States Patent
Tokoi et al.

(10) Patent No.: US 10,523,100 B2
(45) Date of Patent: Dec. 31, 2019

(54) AXIAL AIR-GAP ROTARY ELECTRIC MACHINE

(71) Applicant: Hitachi Industrial Equipment Systems Co., Ltd., Chiyoda-ku, Tokyo (JP)

(72) Inventors: Hirooki Tokoi, Tokyo (JP); Shuuichi Takahashi, Tokyo (JP); Yasuei Yoneoka, Tokyo (JP); Shinya Yamaji, Tokyo (JP); Toshifumi Suzuki, Tokyo (JP); Katsuyuki Yamazaki, Tokyo (JP); Toru Sakai, Tokyo (JP); Ryousou Masaki, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 275 days.

(21) Appl. No.: 15/305,464

(22) PCT Filed: Dec. 8, 2014

(86) PCT No.: PCT/JP2014/082363
§ 371 (c)(1),
(2) Date: Dec. 20, 2016

(87) PCT Pub. No.: WO2015/162819
PCT Pub. Date: Oct. 29, 2015

(65) Prior Publication Data
US 2017/0126108 A1    May 4, 2017

(30) Foreign Application Priority Data
Apr. 25, 2014 (JP) ................. 2014-090859

(51) Int. Cl.
*H02K 21/24* (2006.01)
*H02K 16/02* (2006.01)
(Continued)

(52) U.S. Cl.
CPC ............ *H02K 21/24* (2013.01); *H02K 1/146* (2013.01); *H02K 1/182* (2013.01); *H02K 1/2793* (2013.01); *H02K 16/02* (2013.01)

(58) Field of Classification Search
CPC ........ H02K 21/24; H02K 1/146; H02K 1/182; H02K 1/2793; H02K 5/225; H02K 16/02; H02K 15/028; H02K 15/12
See application file for complete search history.

(56) References Cited

U.S. PATENT DOCUMENTS

| | | | |
|---|---|---|---|
| 3,638,055 A * | 1/1972 | Zimmermann | H02K 5/128 264/272.19 |
| 2005/0140233 A1 | 6/2005 | Kojima et al. | |

(Continued)

FOREIGN PATENT DOCUMENTS

| | | |
|---|---|---|
| EP | 2 803 865 A1 | 11/2014 |
| JP | 55-49968 A | 4/1980 |

(Continued)

OTHER PUBLICATIONS

International Search Report (PCT/ISA/210) issued in PCT Application No. PCT/JP2014/082363 dated Mar. 17, 2015 (four (4) pages).

(Continued)

*Primary Examiner* — Jue Zhang
(74) *Attorney, Agent, or Firm* — Crowell & Moring LLP (57) ABSTRACT

The present invention provides an axial air-gap rotary electric machine with which it is possible to achieve downsizing and increased output as well as an improvement in the support strength of a molded resin and housing and a reduction in the manufacturing cost of the housing. Provided is an axial air-gap rotary electric machine having: a stator in which a plurality of core members, which have at least an iron core and a coil, are arranged in a circular shape centered around a rotating shaft and curved around the inner periph- (Continued)

eral surface of a housing; and a rotor that faces an end surface of the iron core with a prescribed air gap therebetween in the radial direction of the rotating shaft. Therein, the housing has, in the surface facing the stator, a hole that communicates with the outside, and the stator has a resin molded portion formed by filling a resin into at least the surface of the core members facing the inner peripheral surface of the housing, and into the hole, and molding integrally.

11 Claims, 7 Drawing Sheets

(51) Int. Cl.
    *H02K 1/14*     (2006.01)
    *H02K 1/18*     (2006.01)
    *H02K 1/27*     (2006.01)

(56) References Cited

U.S. PATENT DOCUMENTS

| | | |
|---|---|---|
| 2006/0113856 A1 | 6/2006 | Tanno et al. |
| 2007/0214632 A1 | 9/2007 | Kojima et al. |
| 2012/0285321 A1 | 11/2012 | Koski |
| 2014/0361643 A1 | 12/2014 | Kamiya |
| 2015/0108859 A1 | 4/2015 | Nakazumi et al. |
| 2015/0303745 A1 | 10/2015 | Matsumoto |

FOREIGN PATENT DOCUMENTS

| | | | |
|---|---|---|---|
| JP | 59-172941 A | | 9/1984 |
| JP | 5-284711 A | | 10/1993 |
| JP | 2006-254562 A | | 9/2006 |
| JP | 2006254562 A | * | 9/2006 |
| JP | 2007-60788 A | | 3/2007 |
| JP | 2013-130088 A | | 7/2013 |
| JP | 2013-240215 A | | 11/2013 |
| JP | 2014-117029 A | | 6/2014 |
| JP | 2014-241663 A | | 12/2014 |
| TW | 200627754 A | | 8/2006 |
| TW | 200818661 | | 4/2008 |
| TW | M357794 | | 5/2009 |
| TW | 201303190 A1 | | 1/2013 |
| TW | 201311165 A1 | | 3/2013 |

OTHER PUBLICATIONS

Taiwanese Office Action issued in counterpart Taiwanese Application No. 10520005810 dated Jan. 5, 2016, with English translation (eleven (11) pages).
Extended European Search Report issued in counterpart European Application No. 14889883.6 dated Nov. 7, 2017 (8 pages).
Unverified English translation of previously submitted document B3 (JP 5-284711 A) (6 pages).
European Office Action issued in counterpart European Application No. 14889883.6 dated Feb. 14, 2019 (seven (7) pages).

* cited by examiner

AXIAL AIR-GAP ROTARY ELECTRIC MACHINE

TECHNICAL FIELD

The present invention relates to an axial air-gap rotary electric machine, and relates to an axial air-gap rotary electric machine for fixing a stator to a housing.

BACKGROUND ART

An axial gap-type rotary electric machine is arranged with a cylindrical stator and a disk-shaped rotor facing each other in a rotation axis diameter direction with a predetermined air gap interposed therebetween. The stator includes multiple iron cores arranged along the inner periphery direction of the housing unit and coils wound around the iron cores. Since a gap surface generating a torque increases substantially in proportional to a square of a diameter, the axial air-gap rotary electric machine is considered to be a rotary electric machine suitable for a thin shape.

In particular, a double rotor type axial gap-type rotary electric machine in which a single stator is sandwiched by two rotators can ensure twice a gap area size, and therefore, this attracts attention as a structure that may be able to provide more superior characteristics. In the double rotor type axial gap-type rotary electric machine, the iron cores and the coils are arranged independently, and therefore, they are often supported and fixed on a housing with mold resin. A torque repulsive force in a diameter direction and an attraction force in an axial direction are exerted on the stator as an electromagnetic force received by the iron core. In the double rotor type axial gap-type rotary electric machine, the axial direction attraction force between the rotator and the stator is balanced, and therefore, a load in the axial direction is not generated in the stator in the ideal case. In reality, however, when an unbalance occurs in the axial direction attraction force due to an unbalance of the gap and dimensional variations in the components, the load in the axial direction is generated. Therefore, the interface between the mold resin and the housing is required to have a sufficient strength for supporting the load in the peripheral direction and the axial direction.

Patent Literature 1 discloses a method for providing a groove on an inner periphery surface of a housing and making a mold resin and the housing into a structure for making an engagement with a recess and projection shape to support them, and a method for combining the groove and an insert member to support them.

CITATION LIST

Patent Literature

PATENT LITERATURE 1: Japanese Patent Application Laid-Open No. 2007-60788

SUMMARY OF INVENTION

Technical Problem

In this case, an adhesion force between the mold resin and the housing greatly changes in accordance with a surface state of the housing, a temperature during resin injection, a condition of pressure, and the like. In an actual usage environment of a rotary electric machine, thermal loads, vibration, and the like may be applied. Further, the rotary electric machine may be used over a long period of time such as several years to several dozen years. Therefore, supporting the core member with only the adhesion force of the mold resin and the housing may not be sufficient in terms of reliability.

On the other hand, like Patent Literature 1, the structure provided with the insert member and the groove of the inner periphery surface of the housing is a structure in which the mold resin and the housing mesh with each other, and therefore, even if the mold resin is detached from the housing, the iron core and the like (the core member) can be supported on the housing, and this can be said to be a structure having a high support strength and having a high level of reliability.

However, the groove processing to the inner periphery surface of the housing can be a factor to increase the processing time and the processing cost for a lathe, a broaching machine, an NC machine, and the like. There is a method for providing a groove in advance when a housing is molded, but a groove shape cannot be changed in accordance with a load applied to the interface and the shape of the core, and therefore, this may be a factor to increase the cost of many types of products with the same housing. In order to reliably support the mold resin and the housing in accordance with this method, it is necessary to provide a groove deep enough to allow the mold resin and the groove of the housing to engage with each other even in a case where the mold resin is detached and the resin shrinks due to the weight reduction of the stripped surface. Therefore, an adequate housing thickness is required.

In the rotary electric machine held by the mold resin, transfer molding for pressurizing and filling heated resin may be performed from the perspective of strength and mass production. In this case, a high pressure is applied to the housing during molding. In a case where the groove processing is applied, the thin housing surface may surrender to the pressure from the mold resin to be broken.

Solution to Problem

To achieve the above object, for example, configurations described in claims are applied. That is, the configurations include an axial air-gap rotary electric machine including a stator in which a plurality of core members having at least an iron core and a coil are arranged in an annular shape along an inner periphery surface of a housing around a rotation axis, and a rotator facing an end surface of the iron core with a predetermined air gap interposed in a rotation axis diameter direction, wherein the housing has a hole portion, in communication with an outside, in a surface facing the stator, and the stator has a resin mold portion integrally molded by filling resin into at least a side surface of the plurality of the core members which faces the inner periphery surface of the housing and the hole portion.

Advantageous Effects of Invention

According to an aspect of the present invention, the resin mold portion for fixing the stator and the housing is a hole, and therefore, the processing is easy. Further, since it is a hole portion for penetrating through the housing, the tensile strength exerted on the end portion of the resin filled in the hole portion can be relieved in accordance with the force exerted in the rotation axis direction and the rotation axis diameter direction, so that the damage of the housing can be prevented.

The problems, configurations, and the effects other than those explained above would be understood from the following explanation about the embodiments.

DESCRIPTION OF EMBODIMENTS

First Embodiment

Figure 1A:
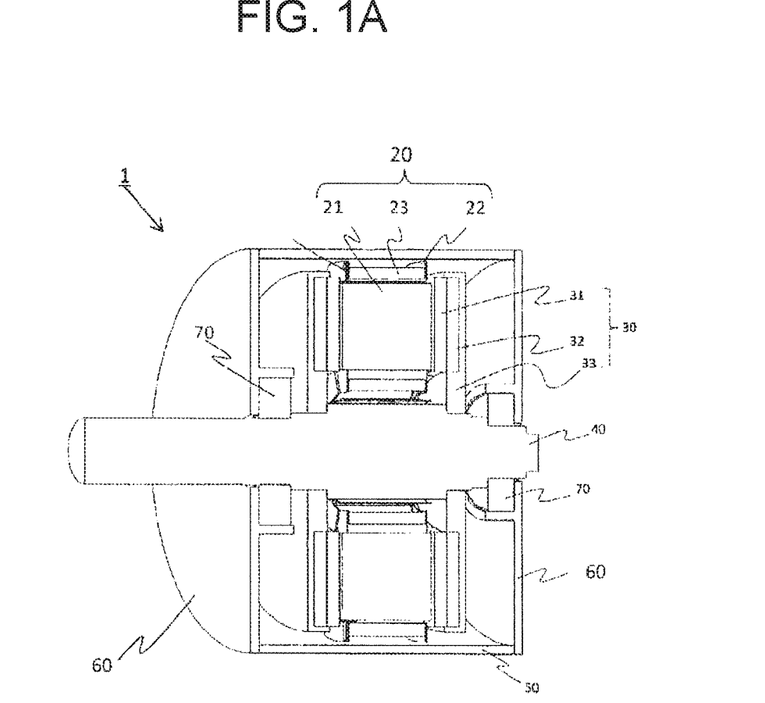
FIG. 1A is a cross sectional view illustrating a configuration of a double rotor-type axial air-gap motor according to a first embodiment to which the present invention is applied.

Hereinafter, modes for carrying out the present invention will be explained with reference to drawings. FIG. 1(a) illustrates a cross sectional view expressing a schematic configuration of a double rotor-type axial gap-type permanent magnet synchronous motor 1 (which may be hereinafter simply referred to as a "motor 1") according to the first embodiment to which the present invention is applied.

The motor 1 is arranged so that a donut-shaped stator 19 arranged along an inner periphery surface of a housing 50 is sandwiched by two disk-shaped rotators 30 with a predetermined air gap in a rotation axis diameter direction so that the two disk-shaped rotators 30 face each other. The center of the disk of the rotator 30 is fixed to the rotation axis 40. The rotation axis 40 is arranged to penetrate through the central portion of the stator 19, and both end portions are rotatably fixed to brackets 60 with bearings 70. The end brackets 60 are fixed at around both opening end portions of the housing 50 made in a substantially cylindrical form.

The rotator 30 includes a permanent magnet 31 on a circular yoke 33 with a back yoke 32 interposed therebetween. The permanent magnet includes multiple flat plate-shaped magnets made in a substantially fan shape around the direction of the rotation axis 70, and is arranged with magnets having different polarities in the rotation direction. The permanent magnet 31 is made of Ferrite, but the embodiment is not limited thereto.

Figure 1B:
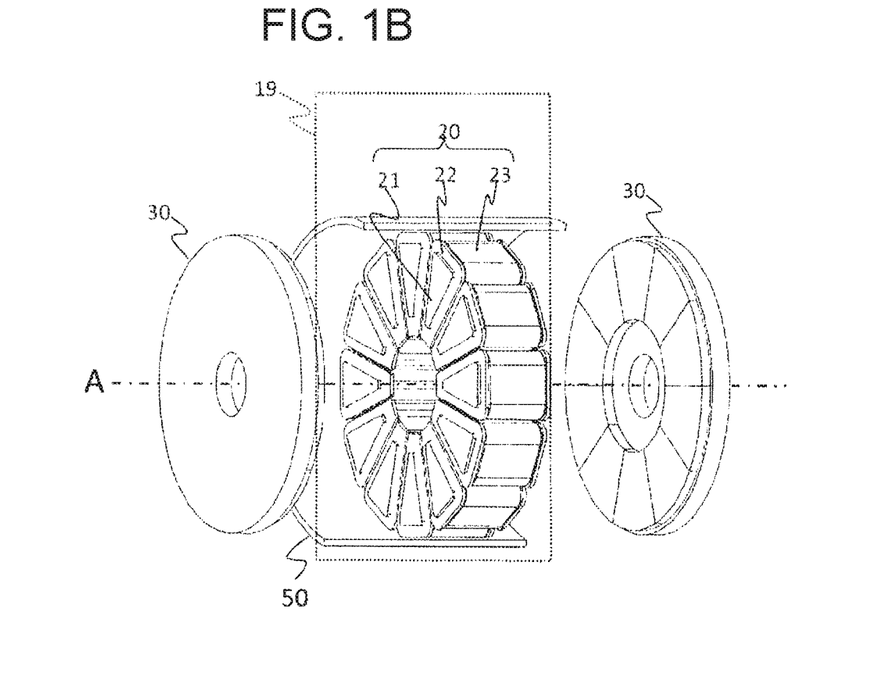
FIG. 1B is a portion perspective view illustrating an overview of an armature configuration of a motor according to a first embodiment.

FIG. 1(b) is a perspective view schematically expressing an armature configuration of the motor 1. The stator 19 includes twelve core members 20 arranged along the inner periphery of the housing 50 in such a manner that the rotation axial center A is the central direction. A single core member 20 constitutes a single slot. The core members 20 are integrally formed with each other with resin mold, and the core members 20 and the inner periphery of the housing 50 are integrally formed with each other with resin mold, and they can be fixed to the stator.

Figure 2:
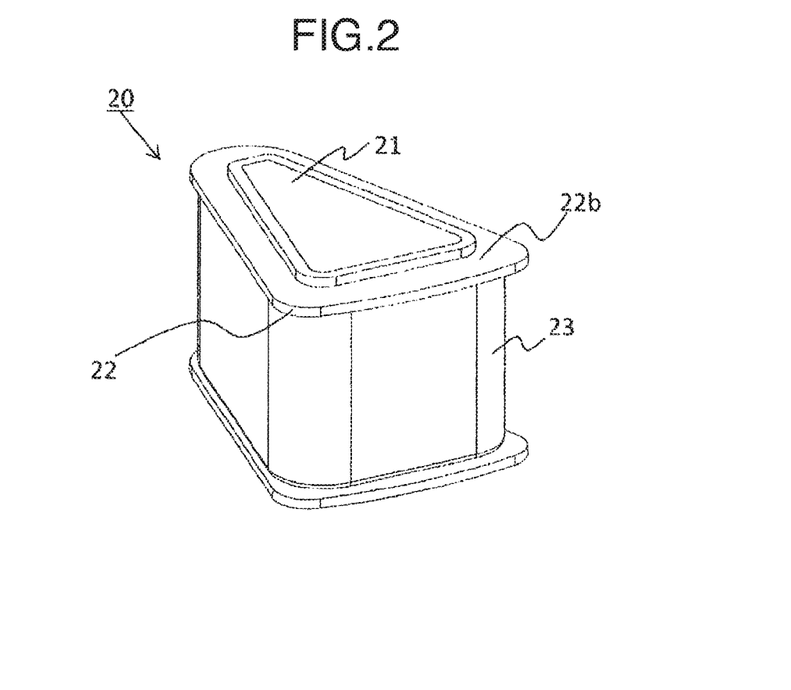
FIG. 2 is a perspective view illustrating a core member for a single slot of a motor according to the first embodiment.

FIG. 2 is a perspective view expressing a configuration of the core member 20. The core member 20 includes an iron core 21, a bobbin 22, and a coil 23. The iron core 21 is a laminated iron core made of a pillar body of which end surface facing the rotator 30 has a substantially trapezoid shape. The laminated iron core is obtained by laminating, from rotation axial center A to the inner periphery surface of the housing, plate forms (including tapes) including magnetic material in such a manner that a width of the plate piece gradually increases. The iron core 21 is not limited thereto, and may be a dust iron core and a machined iron core, or may be such that a cross section in the rotation axis direction has a T, H, or I character shape. It should be noted that the magnetic material may be amorphous, but the embodiment is not limited thereto.

The bobbin 22 includes a tube shape having substantially the same internal diameter as the external diameter of the iron core 21. At around the both opening portions of the bobbin 22, flange portions 22b are provided to extend for a predetermined width over the entire periphery from the external tube portion in the direction perpendicular thereto. In the external tube portion, the coil 23 is wound between both of the flange portions 22b.

In the motor 1 having such configuration, an alternate electric current is applied to the coil 23 with an inverter (not shown), and a rotation magnetic field generated in the stator 19 and a direct current magnetic field of the rotator 30 attract and repels each other, so that a torque is generated. At this occasion, a torque repulsive force in a peripheral direction is exerted to the rotator 30 in a direction opposite to the rotation direction. In a case where the magnetic attraction force between the upper and lower rotator 30 become unbalanced because of variations of components dimensions and assembly precision, a force is also exerted in the rotation axis direction. As described above, a load in the peripheral direction and the axial direction is applied to the interface between the mold resin and the housing 50. One of the characteristics of the first embodiment is that the resin mold is used for such load.

Figure 3:
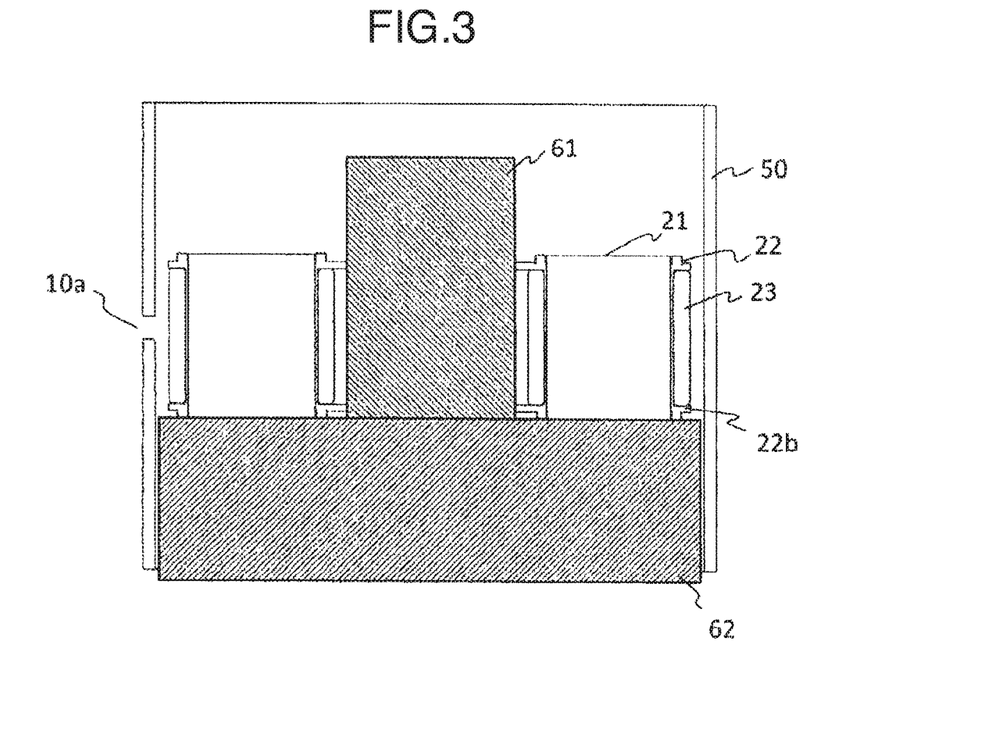
FIG. 3 is a schematic diagram illustrating resin mold of the stator according to the first embodiment.

FIG. 3 schematically illustrates a resin mold step for integrally forming the core members 20 with each other and the inner periphery of the housing 50. The housing 50 is inserted into a lower die 62 having a substantially the same internal diameter, and a middle die 61 in a tube shape for forming an axial center space through which the rotation axis penetrates later is placed from the opposite side opening of the housing 50 into the center of the lower die 62. The core members 20 are arranged in an annular shape around the middle die 61. At this occasion, the flange portion 22b of the bobbin performs positioning of the diameter direction and positioning of adjacent core members 20 in the rotation axis rotation direction.

Thereafter, an upper die having substantially the same external diameter as the internal diameter of the housing 50 and having a cylindrical space in the center through which the middle die 61 penetrates is inserted from the housing opening at the side opposite to the lower die 62, so that the core member 20 is sandwiched and supported. Thereafter, resin can be sealed from the surface opposite to the upper die and lower die 62. The resin is filled, without any gap, into between the core members 20, the inner periphery surface of the housing 50, the direction of the middle die 61, and a surface of the flange portion 22b of the bobbin opposite to the rotator 30, and the resin also gradually flows into the fixation area 10a (hole portion) provided in the housing 50. For example, in a case where the core members 20 are coupled with each other with a ring member such as metal, and an annular shape is maintained, the resin can be filled into between the housing 50 and a surface of the core member 20 at least opposite to the inner periphery surface of the housing 50 (side surface of trapezoid lower bottom side).

The fixation area 10a is a hole that penetrates through the inside and the outside of the housing 50, and is provided at a predetermined position to fix the stator 19 at a desired position of the housing 50. In the first embodiment, the fixation area 10a is considered to be provided substantially at the middle of the width of the stator 19 in the rotation axis direction. There may be multiple fixation areas 10a. In the present embodiment, the fixation area 10 is a circular hole, but may also be a semicircular, polygonal shape, or the like.

Figure 4:
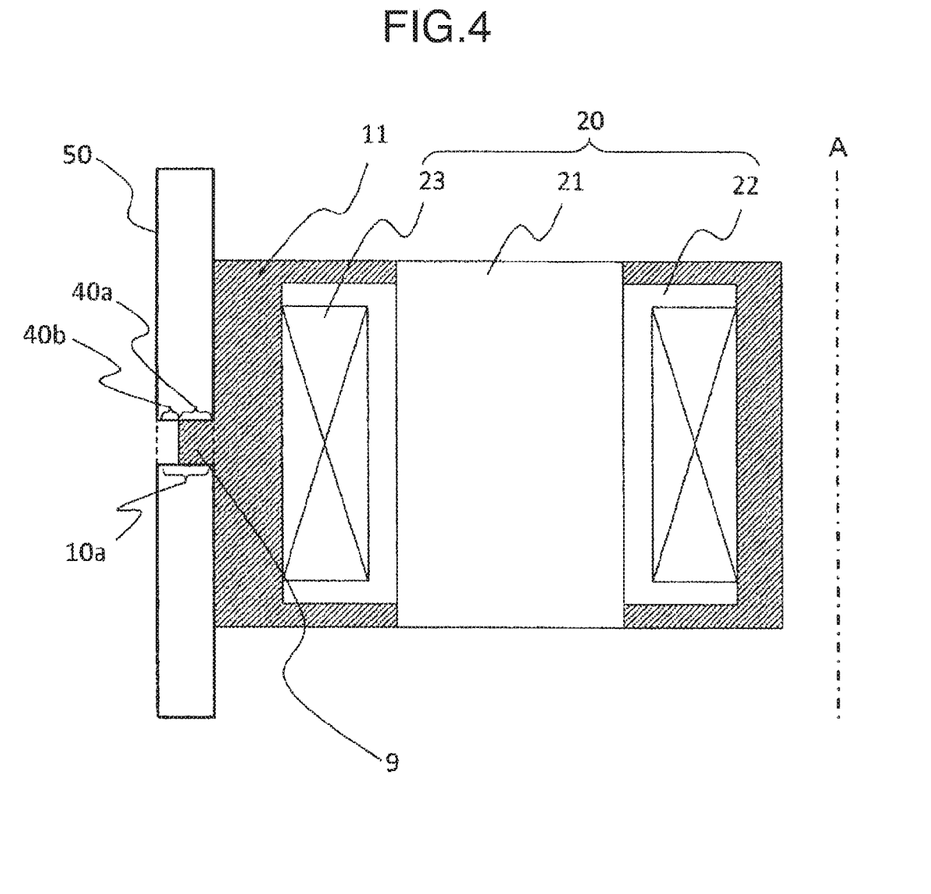
FIG. 4 is a partially enlarged view illustrating an example of a fixation area (hole portion) according to the first embodiment.

FIG. 4 illustrates an enlarged view around the fixation area 10a. The fixation area 10a includes a fixed portion 40a formed with a protruding portion 9 where the resin flows into, and a taper portion 40b where the resin does not flow into. When the resin is also filled in the fixation area 10a and eventually cured, the protruding portion 9 is formed. More specifically, a mold portion 11 in a shape integrally having resin filled around the stator 19 and the protruding portion 9 formed in the fixed portion 40a is formed.

Figure 6A:
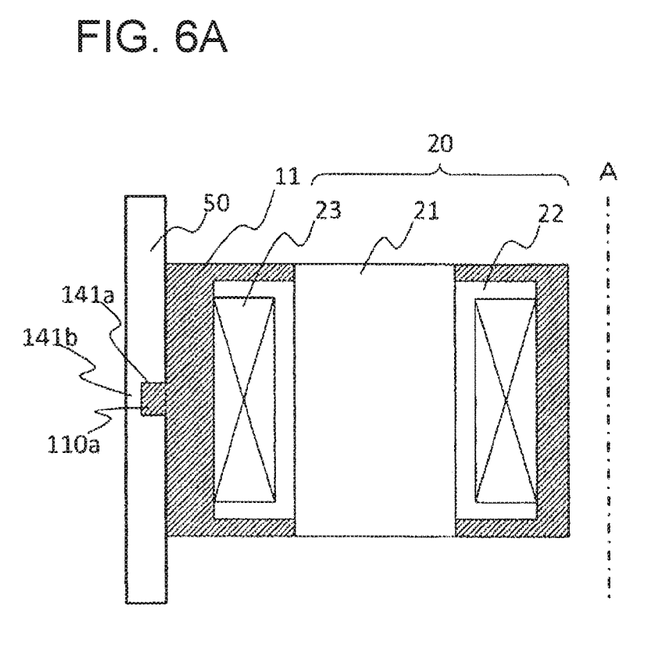
FIG. 6A is a partially enlarged view illustrating an example of a fixation area according to a comparative example.

In this case, an advantage as to why the fixation area 10a is configured to penetrate through the housing 50 will be explained with reference to a comparative example. FIG. 6(a) illustrates a fixation area according to a comparative example. In FIG. 6(a), reference symbol 110a denotes a fixation area of the comparative example. In the comparative example, it is not made as a hole penetrating through the housing 50, and is formed as a recessed portion on the inner periphery side without any penetration. As a result, in the housing 50, a thin thickness portion 141b is formed on the extension of the fixation area 110a.

Figure 6B:
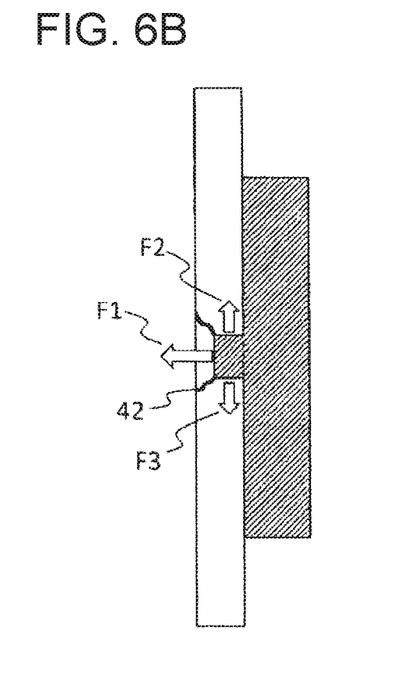
FIG. 6B is a schematic diagram illustrating an example of an effect caused on a housing by a protruding portion of a resin mold portion.

FIG. 6(b) illustrates an enlarged view around the fixation area 110a. When a force in the rotation axis direction and the rotation axis diameter direction is exerted on the stator 19, forces F1 to F3 are generated in the protruding portion 9 with the housing 50. In this case, when an end edge (corner) portion of the protruding portion 9 is considered (dotted line portion), a tensile strength is generated on a part of all of the edge against the forces in the rotation axis direction such as F1 to F3, and the load is generated in the housing 50. With such load, a crack 42 may be made in the housing 50.

In contrast, in the present embodiment, the fixation area 10a is configured to penetrate through the housing 50, and therefore, a force exerted on the edge (corner) at the end of the protruding portion 9 in accordance with the force exerted from the rotation axis diameter direction and the rotation axis direction can be relieved. More specifically, when a force is exerted from the rotation axis diameter direction and the rotation axis direction to the stator 19, the force in the rotation axis diameter direction and the rotation axis direction is exerted on the protruding portion 9 accordingly. In the cured protruding portion 9, mainly, these forces most greatly propagate to the edge (corner) at the end of the protruding portion 9, but because the fixation area 10a is a penetration hole, the fixation area 10a serves as a space in which the edge escapes to the outside of the housing 50 and the taper portion 40b.

In the fixation area 10a, the protruding portion 9 is formed while leaving the taper portion 40b. This is advantageous for more effectively preventing the resin from leaking out of the fixation area 10a.

Figure 5A:
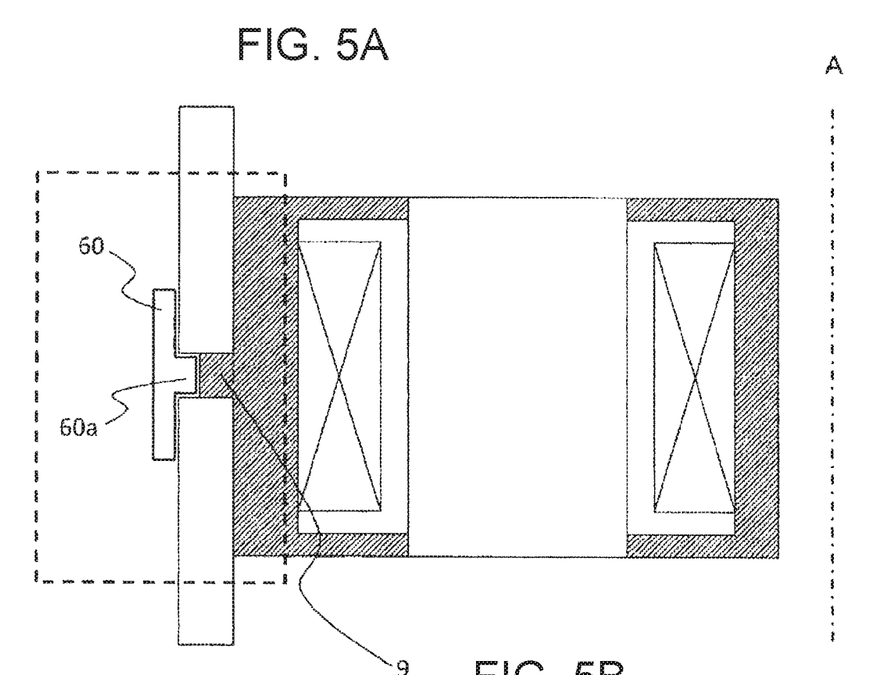
FIG. 5A is a partially enlarged view illustrating an example of a holding form according to the first embodiment.

FIG. 5(a) illustrates how a holding form 60 is applied in order to prevent the resin from leaking out of the fixation area 10a. The holding form 60 includes a projection shape 60a having substantially the same external diameter as the internal diameter of the fixation area 10a, and the projection shape 60a is embedded in the fixation area 10a from the outer periphery side of the housing 50. As shown in the drawing, an L-shaped gap serving as a leakage flow path of resin is formed between the projection shape 60a and the fixation area 10a, but such bent flow path increases the resistance of the resin, and this is suitable for preventing the leakage. When the leakage resistance is high, the filling pressure of resin can be enhanced accordingly.

Figure 5B:
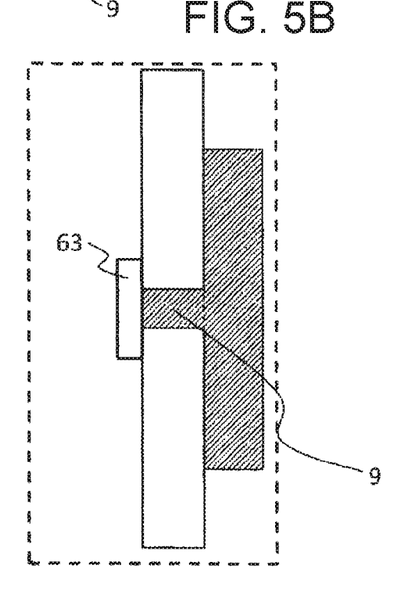
FIG. 5B is a partially enlarged view illustrating another example of a holding form according to the first embodiment.

It should be noted that the present invention is not limited to the configuration provided with the taper portion 40b, and as illustrated in FIG. 5(b), the entire fixation area 10a may be filled with resin. In this case, the holding form 63 may be a flat surface member for holding the fixation area 10a from the outer periphery side. An advantage of easily removing the holding form 63 after filling the resin can be expected.

The internal side surface of the fixation area 10a may be formed in a screw hole shape. In this case, when a surface of the holding form 60 facing the fixation area 100 is made into a screw shape, the holding form 60 can be reliably fixed to the housing, or this can suppress a deviation of the position of the holding form 60 and can suppress leakage of the resin caused by the filling pressure during molding.

According to the motor 1 of the first embodiment, the stress of the stator 19 and the housing 50 against the force in the rotation axis diameter direction and the rotation axis direction are improved, and the fixing of them both can be made reliably, and this can greatly contribute to the performance of the motor 1.

Since the fixation area 10a is the penetration hole, the protruding portion 9 does not damage the housing 50 because of the force exerted on the stator 19 in the rotation axis diameter direction and the rotation axis direction, and a sufficient support strength can be ensured.

The molding step for molding the core members 20 with each other and the housing 50 also serves as the step of forming the protruding portion 9, and therefore, the working efficiency is significantly improved. The fixation area 10a can be obtained from a simple step of providing the hole in the housing 50.

Second Embodiment

Figure 7A:
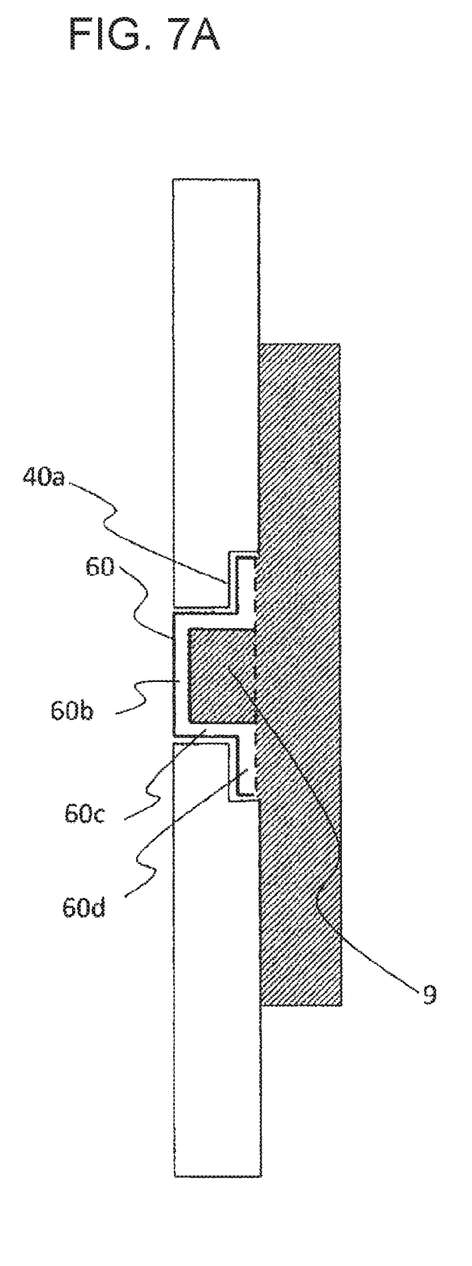
FIG. 7A is a partially enlarged view illustrating an example of a holding form according to a second embodiment.
Figure 7B:
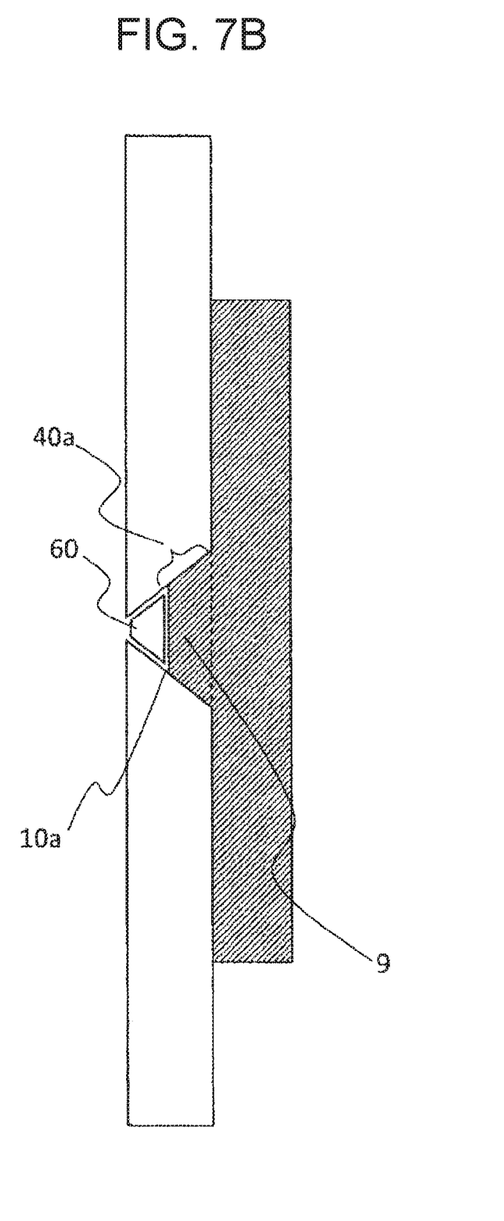
FIG. 7B is a partially enlarged view illustrating another example of a holding form according to the second embodiment.

One of the characteristics of a motor 1 according to the second embodiment is that a holding form 60 is installed from an inner periphery side of a housing 50. FIGS. 7(a) and 7(b) illustrate enlarged views illustrating around the fixation area 10a. The same portions as those of the first embodiment will be denoted with the same reference numerals, and explanation thereabout is omitted.

First, the holding form 60 of FIG. 7(a) has a substantially C-shaped cross section constituted by a bottom surface 60b and a side surface 60c, and has a shape having a flange portion 60d extending over the entire periphery of the opening portion side (pot shape). The housing 50 is provided with a hole having substantially the same internal diameter as the external diameter of the tube portion constituted by the bottom surface 60b and the side surface c, and is provided with a circular groove in which a portion around the edge of the inner periphery side of the housing 50 of the hole substantially matches the diameter of the flange portion 60d. When the holding form 60 is fit in the fixation area 10a, the bottom surface 60b is at a position matching the outer periphery surface of the housing 50, and the flange portion 60d is at a position matching the inner periphery surface of the housing 50. The resin is filled after the holding form 60 is installed in the fixation area 10a from the inner periphery surface of the housing 50.

The flange portion 60d serves as a retainer in the diameter direction. More specifically, the flange portion 60d has an external diameter which is larger than the internal diameter of the housing side opening portion of the fixation area 10a, and therefore, when a force in the diameter direction is received due to the pressure of the resin, the flange portion 60d is engaged with the housing 50, and the flange portion 60d functions as a lid for the resin. When the flange portion 60d is pressed onto the housing, a gap from the housing 50 is reduced, and the leakage of the resin is suppressed. When the flange portion 60d is arranged with a ramp provided in the housing 50, this can suppress the mold resin from entering into a space where the gap from the housing 50 is narrow, and can prevent the holding form 60 itself from moving to the side of the core member 20.

The present modification can be achieved by just installing the holding form 60 in the housing 50 in a stage before the resin mold step, and can save the trouble of arranging or removing the leakage prevention form at the outer periphery side of the housing 50.

The shape of the holding form 60 is such that the outer periphery thereof comes into close contact with the penetration hole and the ramp provided in the housing 50, and therefore, a sufficient support force is achieved for the force exerted on the stator 19 in the rotation axis diameter direction and the rotation axis direction.

The holding form 60 comes into contact with the housing 50 by using the filling pressure of the resin, so that the resin leakage can be prevented.

It is the holding form 60 that receives the load with a tensile strength generated at the end edge (corner) of the protruding portion 9, and therefore, even if a crack is generated, the housing 50 can be maintained by only replacing the holding form 60. Further, such cracks can be solved when the holding form 60 is constituted by a member having a higher strength (metal such as aluminum), and when the holding form 60 is constituted by resin, rubber, and the like, the force of the edge portion can be relieved with an elastic stress.

In a case of the holding form 60 as illustrated in FIG. 7(a), it is sufficient for the holding form 60 to have only a surface covering the protruding portion 9 and a surface facing the inner periphery surface of the housing. The holding form 60 is not limited to the shape in this drawing.

Subsequently, a configuration of another holding form 60 is illustrated in FIG. 7(b). A fixation area 10a has an internal diameter in a (circular) truncated cone shape in a tapered shape in which a cross section gradually decreases from the inner periphery side to the outer periphery side of the housing 50. The holding form 60 includes a (circular) truncated cone having an outer periphery shape substantially matching a top portion (housing outer periphery side) side of the circular truncated cone, and puts a lid at the top portion side of the fixation area 10a by using the filling pressure of the resin. More specifically, the holding form 60 is a truncated cone, and therefore, the holding form 60 has an external diameter portion larger than the internal diameter of the housing outer periphery side opening of the fixation area 10a, and the surface at the lower bottom side is located at the outer periphery side with respect to the inner periphery surface of the housing.

As compared with the configuration of FIG. 7(a) explained above, the holding form 60 having a simpler configuration can be realized in FIG. 7(b).

As the width of the fixed portion 40a in the rotation axis direction increases toward the bottom surface side (at the side of the core member 20) in the truncated cone-shaped fixation area 10a, the support strength of the stator 19 can be sufficiently ensured. With this structure, the resin leakage can be effectively suppressed with the simpler holding member.

Third Embodiment

Figure 8:
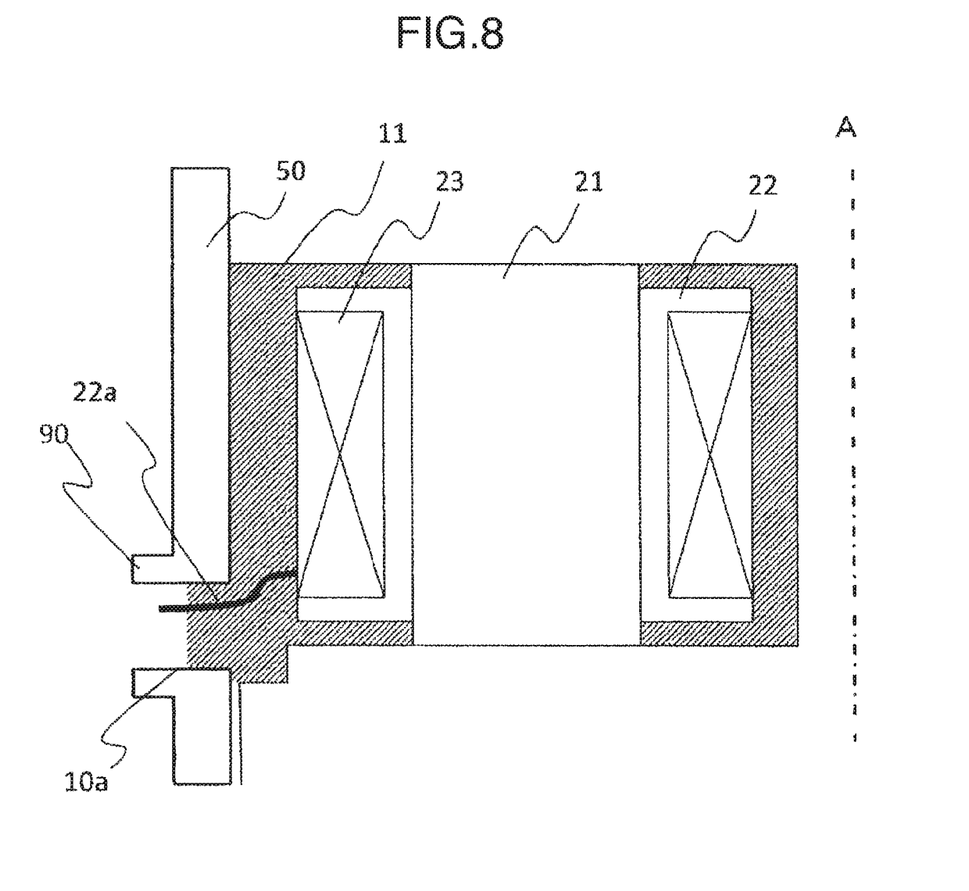
FIG. 8 is a partially enlarged view illustrating a configuration of a fixation area according to a third embodiment.

One of the characteristics of a motor 1 according to the third embodiment is a configuration in which a fixation area 10a also serves as a connection port for extending a connecting line of each core member 20 to the outside of the housing 50.

FIG. 8 illustrates a fixation area 10a according to the third embodiment. The same portions as those of the first embodiment will be denoted with the same reference numerals, and explanation thereabout is omitted.

The fixation area 10a is provided on the housing 50 close to an output side or an anti-output side of the core member 20. More preferably, the fixation area 10a is arranged at a side where the connecting line 23a extends from the core member 20 (output or anti-output side).

The connecting line 23a extending from each core member 20 is arranged along the inner periphery surface of the housing 50 toward the fixation area 10a, and is integrally formed with the stator 19 with resin mold. The connecting line 23a passes through the fixation area 10a to extend to the outside of the housing.

The outer periphery side of the housing 50 of the fixation area 10a is provided with a thick portion in a diameter direction such as, e.g., a base 90 for installing a terminal box (not shown).

According to the third embodiment, the connection port of the connecting line 23a and the fixation area 10a can be shared, and the processing cost can be reduced.

Just like the base 90, the periphery of the fixation area 10a has a thick thickness to protrude to the outer periphery side. Therefore, the strength around the fixation area 10a can be ensured.

In the third embodiment, the fixation area 10a is configured to be installed at the output axial or anti-output axial side of the core member 20, but the embodiment is not limited thereto. The fixation area 10a may be installed in proximity to the center in the axial direction of the core member 20. This can be changed as necessary in accordance with, e.g., a position where the connecting line 23a is extended.

Multiple fixation areas 10a serving as connection ports may be provided.

The embodiments for carrying out the present invention have been hereinabove explained, but various changes can be made in the present invention without contradicting the gist of the present invention. For example, in the above explanation, for example, the double rotor-type axial gap-type permanent magnet synchronous motor has been explained, but a single rotor type may be used, or axial gap-type permanent magnet synchronous motors in other forms may also be used. The present invention can also be applied to a synchronous reluctance motor, a switched reluctance motor, or an induction motor having no permanent magnet. Further, the present invention can also be applied to a generator instead of a motor.

A cover may be provided on the outer periphery surface of the fixation area 10a so as to cover the protruding portion 9 of the mold resin. As a result, degradation of the protruding portion 9a can be prevented.

The fixation area 10a may be provided in an area where a part or all thereof faces the diameter direction of the core member 20, and the position, the number, and the shape thereof is not particularly limited. For example, a single fixation area 10a may be provided, or multiple fixation areas 10a may be provided. A single fixation area 10a or multiple fixation areas 10a may be provided in the rotation axis direction. The cross-sectional shape in the fixation area may be in a circular, elliptic, or polygonal shape. In a case where multiple fixation areas 10a are provided, it is not necessary to make all of them to be in the same shape, and the fixation areas 10a may be formed in different shapes. As described above, when the number and the shape of fixation areas provided for a single stator are increased, the support strength of the mold resin for the housing can be improved.

REFERENCE SIGNS LIST

1 . . . double rotor-type axial air-gap permanent magnet synchronous motor (motor), 9 . . . protruding portion, 10a . . . fixation area, 11 . . . mold portion, 19 . . . stator, 20 . . . core member, 21 . . . iron core, 22 . . . bobbin, 22b . . . flange portion, 23 . . . coil, 23a . . . connecting line, 24 . . . core member, 40 . . . rotation axis, 40a . . . fixed portion, 40b . . . taper portion, 42 . . . crack, 49 . . . end bracket, 50 . . . housing, 50a . . . engagement unit, 60 . . . holding form, 60a . . . projection shape, 60b . . . bottom surface, 60c . . . side surface, 60d . . . flange portion, 61 . . . middle die, 62 . . . lower die, 63 . . . holding form, 70 . . . bearing, 90 . . . base, 110a . . . protruding portion, 141a . . . fixation area, 141b . . . thin thickness portion, A . . . rotation axis, F1, F2, F3 . . . force

The invention claimed is:

1. An axial air-gap rotary electric machine comprising a stator in which a plurality of core members having at least a core and a coil are arranged in an annular shape along an inner periphery surface of a housing around a rotation axis, and a rotator facing an axial end surface of the core with a predetermined air gap interposed in a rotation axis direction,
wherein the housing has a hole portion, in communication with an outside, in the inner periphery surface facing the stator in a radial direction of the rotation axis, and
the stator has a resin mold portion integrally molded fixing the plurality of core members into the housing by filling resin into at least a side surface of the plurality of core members and the hole portion.

2. The axial air-gap rotary electric machine according to claim 1, wherein the resin filled in the hole portion has a thickness equal to or less than a thickness of the housing.

3. The axial air-gap rotary electric machine according to claim 1, further comprising a holding member for shielding the hole portion from an outer periphery side of the housing,
wherein in the resin mold portion, the resin is filled to the holding member.

4. The axial air-gap rotary electric machine according to claim 3, wherein
the holding member has a projection shape having substantially the same external diameter as an internal diameter of the hole portion, and
in the resin mold portion, the resin is filled to an end surface of the projection shape.

5. The axial air-gap rotary electric machine according to claim 4, wherein
the hole portion includes at least a screw thread close to a housing outer periphery, and
the holding member has a projection shape engaging with the screw thread.

6. The axial air-gap rotary electric machine according to claim 1, further comprising a lid member which has an external diameter portion larger than an external diameter of a housing outer periphery side opening portion of the hole portion and in which a surface opposite to the core member is located close to an outer periphery surface of the housing,
wherein the resin mold portion is filled up to a surface of the lid member facing the core member.

7. The axial air-gap rotary electric machine according to claim 1, wherein the hole portion is a connection port in which a connecting line extended from the core member is extended to an outside of the housing.

8. The axial air-gap rotary electric machine according to claim 1, wherein a plurality of hole portions are provided.

9. The axial air-gap rotary electric machine according to claim 1, wherein the mold portion is filled on an entire periphery except at least the axial end surface of the core.

10. The axial air-gap rotary electric machine according to claim 1, wherein the hole portion is provided on the housing close to an output side or an anti-output side of the stator.

11. The axial air-gap rotary electric machine according to claim 10, wherein the hole portion is arranged at a side where the connecting line extends from the core member of the stator.

* * * * *